1

3,082,268
PREPARATION OF 1,2,3,4-TETRAPHENYL NAPHTHALENE
Edward J. McNelis, Media, Pa., assignor to Sun Oil Company, Philadelphia, Pa., a corporation of New Jersey
No Drawing. Filed July 24, 1961, Ser. No. 125,970
4 Claims. (Cl. 260—668)

This invention relates to the preparation of 1,2,3,4-tetraphenyl naphthalene by the pyrolysis of alkali metal o-halobenzoates together with tetraphenylcyclopentadienone.

According to the invention, 1,2,3,4-tetraphenyl naphthalene is prepared by heating a mixture of an alkali metal o-halobenzoate and tetraphenylcyclopentadienone (TPCP) to a temperature in the range of 250–375° C., preferably 300–340° C. The following reaction takes place to substantial extent:

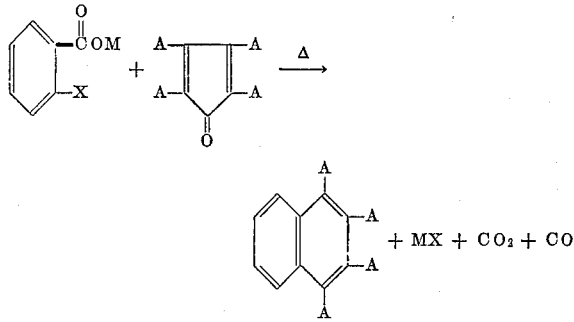

In the equation M is an alkali metal, X is a halogen and A represents the phenyl group. The alkali metal can be lithium, sodium, potassium, rubidium or cesium. The halogen can be chlorine, bromine or fluorine and preferably is bromine.

The pyrolysis preferably is carried out at about atmospheric pressure and in a manner to exclude air and moisture from the reaction mixture while permitting escape of the released carbon dioxide and carbon monoxide. The molar ratio of the alkali metal salt to the TPCP can vary widely, for example, from 1:5 to 10:1. It is preferable, however, to use a molar ratio of these reactants substantially in excess of 1:1, for the reason that the alkali metal o-halobenzoate tends to react with itself on pyrolysis to form xanthone. Hence the use of an excess of the TPCP over the salt tends to suppress the xanthone reaction and thus increase the conversion of the salt to the desired substituted naphthalene derivative. The time of heating the reaction mixture will vary depending mainly upon the temperature used but generally will be in the range of 0.1–2.0 hours.

The product mixture from the reaction generally contains, in addition to the tetraphenyl naphthalene and alkali metal halide, other reaction products such as xanthone as well as some unreacted starting material.

The mixture can be worked up by dissolution in a suitable solvent such as benzene, carbon tetrachloride or ether, filtering to remove the salts and evaporating the solvent. The residue can then be dissolved in a mixed solvent such as pentane-benzene in a volume ratio of 80:20, and the solution can be passed through a chromatographic column containing alumina. The first fraction off the column will contain the tetraphenyl naphthalene and can be collected separately.

The following examples are illustrative of the invention:

*Example I*

A mixture of 1.559 g. (4.7 millimoles) of cesium o-bromobenzoate and 1.6512 g. (4.3 millimoles) of tetraphenylcyclopentadienone was placed in a glass tube which had been purged with nitrogen and the tube was heated while the nitrogen purge was continued. The mixture was heated at 335° C. for 10 minutes. After cooling, the mixture was triturated with benzene and filtered. Evaporation of benzene left 2.128 g. of residue. This material was dissolved in a 4:1 mixture of pentane-benzene and the solution was passed through a column containing acid washed alumina. An initial effluent fraction was collected, and upon evaporation of solvent 144.6 mg. of yellow oily crystals were obtained. These were recrystallized from ethanol, whereby white crystals melting at 203.5–204.5° C. were obtained. The melting point for tetraphenyl naphthalene as reported in the literature is 204–204.5 C. The infrared spectrum of this material was in accord with the structure of tetraphenyl naphthalene. The yield was about 8% of the theoretical based upon the TPCP used.

*Example II*

A mixture of 1.19 g. of potassium o-bromobenzoate and 3.84 g. of TPCP was pyrolyzed by heating to 316° C. The time that the mixture was above 300° C. was 5 minutes. Work-up of product as in the preceding example gave 74 mg. of white crystals melting at 203–204.5 C. and identified as tetraphenyl naphthalene. The yield was 3.4% based on the o-bromobenzoate used.

I claim:

1. Method of preparing 1,2,3,4-tetraphenyl naphthalene which comprises heating a mixture of tetraphenylcyclopentadienone and an alkali metal salt of o-halobenzoic acid to a temperature in the range of 250–375° C., the halogen in said acid being selected from the group consisting of chlorine, bromine and fluorine.

2. Method according to claim 1 wherein said temperature is in the range of 300–340° C.

3. Method according to claim 1 wherein the halogen is bromine.

4. Method according to claim 1 wherein said salt is cesium o-bromobenzoate and the temperature is in the range of 300–340° C.

No references cited.